United States Patent
Tao et al.

(10) Patent No.: US 7,912,108 B2
(45) Date of Patent: Mar. 22, 2011

(54) LASER EMITTING MATERIAL, METHOD FOR MAKING THE SAME AND USE THEREOF

(75) Inventors: Xiaoming Tao, Kowloon (CN); Xiaohong Sun, Kowloon (CN); Jianguo Deng, Kowloon (CN); Kai-Cheong Kwan, Kowloon (CN)

(73) Assignee: The Hong Kong Polytechnic University, Hong Kong SAR (CN)

( * ) Notice: Subject to any disclaimer, the term of this patent is extended or adjusted under 35 U.S.C. 154(b) by 0 days.

(21) Appl. No.: 12/007,573

(22) Filed: Jan. 11, 2008

(65) Prior Publication Data

US 2009/0161699 A1  Jun. 25, 2009

Related U.S. Application Data

(63) Continuation of application No. 11/244,399, filed on Oct. 6, 2005, now abandoned.

(51) Int. Cl.
*H01S 3/20* (2006.01)

(52) U.S. Cl. ............ 372/53; 372/6; 372/39; 372/43.01; 372/51; 372/70; 607/88; 607/89; 607/91; 607/94; 2/905; 2/906

(58) Field of Classification Search ............... 372/6, 53, 372/39, 43.01, 51, 70; 607/88, 89, 91, 94; 2/905, 906
See application file for complete search history.

(56) References Cited

U.S. PATENT DOCUMENTS

| | | | |
|---|---|---|---|
| 4,916,711 A | 4/1990 | Boyer et al. | 372/53 |
| 5,237,582 A | 8/1993 | Moses | 372/53 |
| 5,610,932 A | 3/1997 | Kessler et al. | 372/39 |
| 5,625,456 A | 4/1997 | Lawandy | 356/376 |
| 5,817,089 A | 10/1998 | Tankovich et al. | 606/9 |
| 5,881,886 A * | 3/1999 | Lawandy | 209/3.3 |
| 6,126,653 A | 10/2000 | Hajjar | 606/15 |
| 6,141,367 A * | 10/2000 | Fan et al. | 372/53 |
| 6,312,451 B1 | 11/2001 | Streeter | 607/89 |
| 6,391,022 B1 | 5/2002 | Furumoto et al. | 606/9 |
| 6,443,978 B1 | 9/2002 | Zharov | 607/91 |
| 6,551,308 B1 | 4/2003 | Muller et al. | 606/10 |
| 6,746,473 B2 | 6/2004 | Shanks et al. | 607/89 |
| 7,106,762 B1* | 9/2006 | Jiang et al. | 372/6 |
| 2002/0176463 A1 | 11/2002 | Bullington et al. | 372/45 |
| 2002/0177844 A1 | 11/2002 | Gerlach et al. | 606/5 |
| 2003/0174325 A1* | 9/2003 | Zhang et al. | 356/318 |
| 2004/0004988 A1 | 1/2004 | Cok et al. | 372/70 |
| 2004/0120373 A1 | 6/2004 | Duarte et al. | 372/39 |

FOREIGN PATENT DOCUMENTS

DE  4306789 A1  9/1994

(Continued)

OTHER PUBLICATIONS

Fukuda et al "Solid-State Dye Laser with Photo-Induced Distributed Feedback", Jpn. J. Appl. Phys. vol. 39, 2000, pp. 5859-5863.*
Lawandy et al, NATURE, vol. 368, Mar. 31, 1994, pp. 436-438, Laser action in strongly scattering media.

(Continued)

*Primary Examiner* — Minsun Harvey
*Assistant Examiner* — Yuanda Zhang
(74) *Attorney, Agent, or Firm* — Jacobson Holman PLLC (57) ABSTRACT

A solid-state laser emitting material for use in conjunction with a light source includes a polymer matrix functioning as host materials, containing laser dye of rhodamine 590 or rhodamine 610 as gain materials and nano-submicron particles as scatters therein. The lowest lasing threshold of the laser emitting material is approximately 5 mJ/cm$^2$ for 585 nm emission and 2 mJ/cm$^2$ for 630 nm emission.

17 Claims, 5 Drawing Sheets

FOREIGN PATENT DOCUMENTS

| | | |
|---|---|---|
| EP | 1106209 A1 | 6/2001 |
| EP | 1281378 A1 | 2/2003 |
| JP | 5-212131 | 8/1993 |
| JP | 11-151307 | 6/1999 |
| JP | 2001-95834 | 4/2001 |
| JP | 2001-112773 | 4/2001 |
| RU | 2122873 C1 | 12/1998 |
| RU | 2214844 C1 | 10/2003 |
| WO | WO01/50969 | 7/2001 |
| WO | WO2004/026586 | 4/2004 |

OTHER PUBLICATIONS

Sha et al, OPTICS LTRS, vol. 19, No. 23, Dec. 1, 1994, pp. 1922-1924, Spectral and temporal measurements of laser action of . . . .

Noginov et al, OPTICS Communications 118, 1995, pp. 430-437, Line narrowing in the dye solution with scattering centers.

Zhang et al, Optics Communications 118, 1995, pp. 462-465, Narrow-bandwidth emission from a suspension of dye and scatters.

Berger et al, Optics LTRS, vol. 21, No. 7, Apr. 1, 1996, pp. 450-452, Time-resolved studies of stimulated emission from colloidal . . . .

Van Soest et al, OPTICS LTRS, vol. 24, No. 5, Mar. 1, 1999, pp. 306-308, Amplifying volume in scattering media.

Van Soest et al, Physical Rev Ltrs, vol. 86, No. 8, Feb. 19, 2001, pp. 1522-1525, Dynamics of a Random Laser above Threshold.

John et al, Physical Review, vol. 54, No. 4, Oct. 1996, pp. 3642-3652, Theory of lasing in a multiple-scattering medium.

Wiersma et al, Physical Review, vol. 54, No. 4, Oct. 1996, pp. 4256-4265, Light diffusion with gain and random lasers.

Balachandran et al, Optics LTRS, vol. 22, No. 5, Mar. 1, 1997, pp. 319-321, Theory of laser action in scattering gain media.

Berger et al, Physical Review, vol. 56, No. 5, Nov. 1997, pp. 6118-6122, Dynamics of stimulated emission from random media.

Cao et al, Appl. Phys LTRS, vol. 73, No. 25, Dec. 21, 1998, pp. 3656-3658, Ultraviolet lasing in resonators formed by scaterring . . . .

Ho et al, Physical Rev LTRS, vol. 82, No. 11, Mar. 15, 1999, pp. 2278-2281, Random Laser Action in Semiconductor Powder.

Frolov et al, Physical Review, vol. 59, No. 8, Feb. 15, 1999, pp. 5284-5287, Stimulated emission in high-gain organic media.

Zacharakis et al, Appl Phys LTRS, vol. 81, No. 14, Sep. 30, 2002, pp. 2511-2513, Random lasing following two-photon excitation of . . . .

Prasad et al, Appl Optics, vol. 36, No. 30, Oct. 20, 1997, pp. 7718-7724, Lasing in active, sub-mean-free path-sized systems with . . . .

Cao et al, Physica B, 2003, pp. 215-218, Lasing with resonant feedback in random media.

Cao et al, Physical Review, vol. 61, No. 2, Feb. 2000, pp. 1985-1989, Transition from amplified spontaneous emission to laser . . . .

Balachandran et al, Appl Optics, vol. 35, No. 4, Feb. 1, 1996, pp. 640-643, Laser action in polymeric gain media containing . . . .

Cao et al, Physical Review, vol. 64, Nov. 14, 2001, pp. 1-8, Investigation of random lasers with resonant feedback.

H. Z. Wang, F. L. Zhao, Y. J. He, X. G. Zheng, and X. G. Huang, "Low-threshold lasing of a Rhodamine dye solution embedded with nanoparticle fractal aggregates", May 15, 1998, Optics Letters, vol. 23, No. 10, pp. 777-779.

B. Raghavendra Prasad, Hema Ramachandran, Ajay Kumar Sood, C. K. Subramanian, and Narendra Kumar, "Lasing in active, sub-mean-free path-sized systems with dense, random, weak scaterers", Oct. 20 1997, Applied Optics, vol. 36, No. 30, pp. 7718 to 7724.

R. M. Balachandran, D. P. Pacheco, and N. M. Lawandy, "Photonic textile fibers", Apr. 20 1996, Applied Optics, vol. 35, No. 12, pp. 1991 to 1994.

* cited by examiner

LASER EMITTING MATERIAL, METHOD FOR MAKING THE SAME AND USE THEREOF

This is a continuation of application Ser. No. 11/244,399 filed Oct. 6, 2005 now abandoned.

BACKGROUND

1. Field of the Invention

The present application relates to laser emitting devices, method for making the same and use thereof.

2. Background of the Invention

Random laser devices have been known in the art For example, C. Zacharrakis, "Random lasing following two-photon excitation of highly scattering gain media Applied Physics Letters," 81, 2511 (2002) discloses the use of a femtosecond pulse laser at the wavelength of 800 nm to two-photon excite Coumarin 307 colloid solution to obtain 480 blue emission. B. Raghavendra Prasad, et al, "Lasing in active, sub-mean-free path-sized systems with dense, random, weak scatterers," Applied Optics, 36, 7718 (1997), discloses yellow emission by using a frequency-doubled Nd:YAG laser to pump colloid solution containing Rhodamine 590 perchlorate and polystyrene microspheres. S. John et al, "Theory of lasing in a multiple-scattering medium," Phys. Rev. A, 54, 3642 (1996), H. Cao, "Lasing with resonant feedback in random media," Physica B, 338, 215. (2003) and H. Cao, et al, "Transition from amplified spontaneous emission to laser action in strongly scattering media," Physical Review E 61, 1985 (2000) have disclosed red emission in colloid solutions.

The above-mentioned-laser devices are in a generally liquid format. A skilled person in the art would appreciate that stimulated emission from polymeric solids is much more attractive in terms of applications, stability and cost However, up to now, very few workable polymeric systems have been reported. R. M. Balachandran, et al, "Laser action in polymeric gain media containing scattering particles," Applied Optics 35, 640 (1996) and Y. Ling, et al. "Investigation of random lasers with resonant feedback," Physics Review A 64, 063808-1 (2001) disclose red emission in PMMA at a threshold of 15 mJ/cm$^2$.

However, the relatively high threshold of Balachandran and Ling's laser devices may restrict its applicability.

Furthermore, laser devices have been used in various applications such as for therapy purposes. For example, laser devices with wavelengths of 532 nm, 690 nm and 755 nm are known for their effect to eliminate or reduce black flecks, and a 585 nm laser can clean the red flecks, improve the skin properties and prevent aging. Exemplary applications of laser devices have been disclosed in various prior patents or patent publications, for example, in U.S. Pat. No. 5,625,456, entitled "Optical sources having a strongly scattering gain medium providing laser-like action" and issued to Nabil M. Lawandy on Apr. 29, 1997; PCT publication no. WO04026586A1, entitled "Random laser image projector system and method" filed by Timothy, J Miller on Sep. 16, 2003; U.S. Pat. No. 6,391,022, entitled "Ultra long pulsed dye laser device for treatment of ectatic vessels and method therefore" and issued to Furumoto et al on May 21, 2002; U.S. Pat. No. 6,551,308, entitled "Laser therapy assembly for muscular tissue revascularization" and issued to Muller et al on Apr. 22, 2003; U.S. Pat. No. 6,126,653, entitled "Laser therapy system and method of cutting and vaporizing a tissue body" and issued to John H. Hajjar on Oct. 3, 2000; U.S. Pat. No. 5,817,089, entitled "Skin treatment process using laser" and issued to Tankovich et at on Oct. 6, 1998; US patent publication on. 20020177844, entitled "Medical laser therapy device" and filed by Gerlach et al. on Jan. 10, 2002; U.S. Pat. No. 6,746,473, entitled "Therapeutic laser device" and issued to Shanks et al on Jun. 8, 2004; U.S. Pat. No. 6,312,451, entitled "Low level laser therapy apparatus" and issued to Jackson Streeter on Nov. 6, 2001; EP patent publication no. 1281378A entitled "Laser therapy Apparatus" and filed by Owa et al on Apr. 9, 2001.

However, the threshold restrictions on the laser devices using polymeric solids may inhibit the use of such lasers in these applications as well.

OBJECT OF THE INVENTION

Therefore, it is an object of the present invention to provide an improved laser device with a relatively lower threshold, or at least provide the public with a useful choice.

It is a further object of the present invention to provide an improved laser therapy device with a relatively lower threshold, or at least provide the public with a useful choice.

SUMMARY OF THE INVENTION

According to an aspect of the present invention, a solid-state laser emitting material for use in conjunction with a light source includes a polymer matrix functioning as host materials, containing laser dye of rhodamine 590 or rhodamine 610 as gain materials and nano-submicron particles as scatters therein. The lowest lasing threshold of the laser emitting material is approximately 5 mJ/cm$^2$ for 585 nm emission and 2 mJ/cm$^2$ for 630 nm emission.

According to a second aspect of the present invention, a laser emitting fiber for use in conjunction with a light source includes a polymer matrix functioning as host materials, containing laser dyes of rhodamine 590 or rhodamine 610 as gain materials and nano-submicron particles as scatters therein. The lowest lasing threshold of the laser emitting device is approximately 5 mJ/cm$^2$ for 585 nm emission and 2 mJ/cm$^2$ for 630 nm emission.

According to a third aspect of the present invention, a laser emitting textile is woven, knitted, embroidered, braided or intermingled by a plurality of laser emitting fibers and is for use in conjunction with a light source. Each fiber includes a polymer matrix functioning as host materials, containing laser dyes of rhodamine 590 or rhodamine 610 as gain materials and nano-submicron particles as scatters therein. The lowest lasing threshold of the laser emitting device is approximately 5 mJ/cm$^2$ for 585 nm emission and 2 mJ/cm$^2$ for 630 nm emission. Further, the textile includes two opposite sides, with one side coated with a reflective film.

According to a forth aspect of the present invention, a laser therapy device induces a laser emitting material of a laser emitting film, a laser emitting fiber, a laser emitting textile, or a combination thereof and is for use in conjunction with a light source. The laser emitting material includes a polymer matrix functioning as host materials, containing laser dyes of rhodamine 590 or rhodamine 610 as gain materials and nano-submicron particles as scatters therein, and the lowest lasing threshold of the laser emitting device is approximately 5 mJ/cm$^2$ for 585 nm emission and 2 mJ/cm$^2$ for 630 nm emission.

According to a further aspect of the present invention, a laser emitting fabrics for use in conjunction with a light source, includes, normal fabrics coated with laser emitting materials. The laser emitting material includes a polymer matrix functioning as host materials, containing laser dyes of rhodamine 590 and rhodamine 610 as gain materials and nano-submicron particles as scatters therein, and the lowest lasing threshold of the laser emitting device is approximately 5 mJ/cm² for 585 nm emission and 2 mJ/cm² for 630 nm emission.

Other aspects and advantages of the invention will become apparent from the following detailed description, taken in conjunction with the accompanying drawings, which description illustrates by way of example the principles of the invention.

DETAILED DESCRIPTION

As discussed in details below, the exemplary laser emitting device embodiments of the present invention can be in the format of laser films, textiles, micro laser clusters or random laser fibers. Each includes three major components, namely, a polymer matrix as the host material (for example PMMA or PVA), gain or amplifying media or materials (for example laser dyes or conjugated polymer), and particles as scatters (for example $TiO_2$ or ZnO, etc). When a wide-banded flash lamp or pulsed laser pumps the gain materials of such laser emitting devices, the laser emitting devices emit monochromatic lasers with high power. By changing the gain materials, laser emission with different wavelength such as 585 nm and 610 nm can be realized. In addition, particles have scattering functions and can enlarge the path photons pass in the medium. The path increase produces Amplified Spontaneous Emission. Ordered particle distribution in the localized field act as a feedback cavity and provide random laser emission. Specifically, particles (scatters) may increase the distance a photon travels in the medium. This may increase the probability that one photon is changed into multiple photons.

Furthermore, with the increase of pump energy at 532 nm and 8 ns pulse to duration, a slope change and unsaturated input occurs in the linear input-output characteristics. By adjusting the output energy and laser dyes, flecks and stains in different depth and with different color can be treated. Therefore, the present invention may have applications in skin photothermolysis therapy.

Nano-Composites Film

To form an exemplary laser emitting film (not shown) according to an embodiment of the invention, firstly, 2.2 mg Rhodamine 590 or 610 and 2.4 mg $TiO_2$ nano-particles are mixed in 2 ml of dichloromethane until the dye is dissolved completely. Then 2 ml 13 wt % PMMA dichloromethane solution is added to the above mixture. The mixture is sonificated until a homogeneous solution was formed. A PMMA film containing Rhodamin 590 and $TiO_2$ particles can then be formed by cell-casting of 1 ml of the solution.

Figure 1:
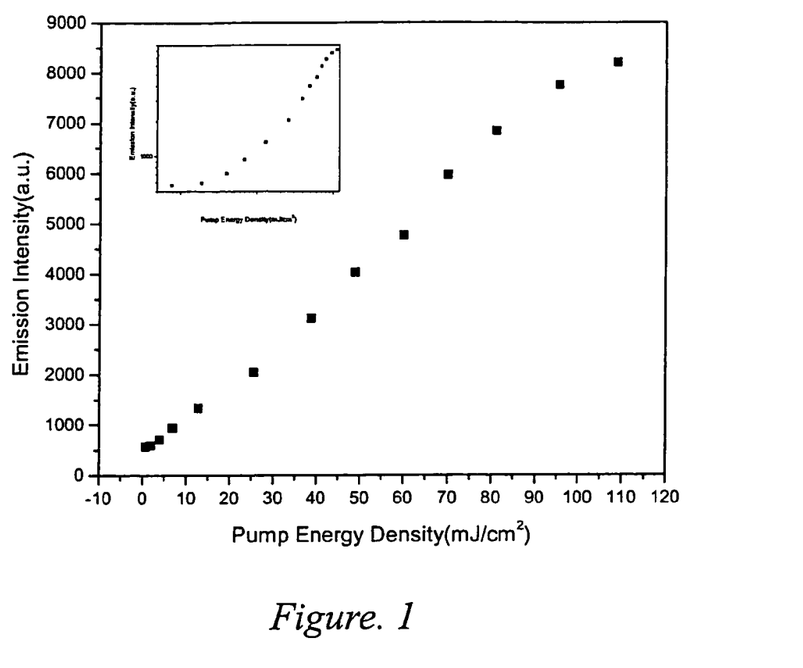
FIG. 1 is illustrates the peak emission intensity of an exemplary laser emitting film containing Rhodamine 590 and $TiO_2$ particles according to an aspect of the present invention. The inset is the log-log scale.
Figure 2:
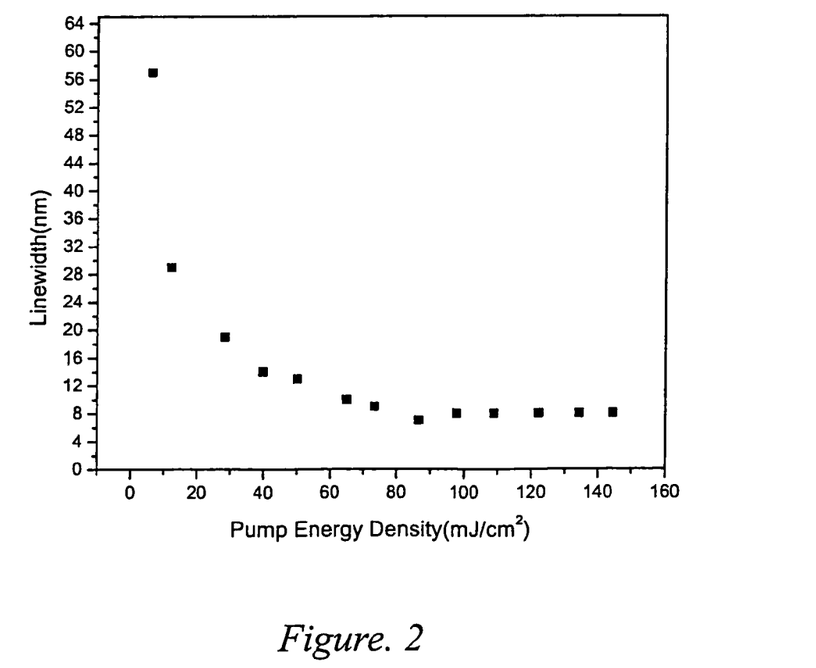
FIG. 2 shows the peak line-width of the film of FIG. 1.
Figure 3:
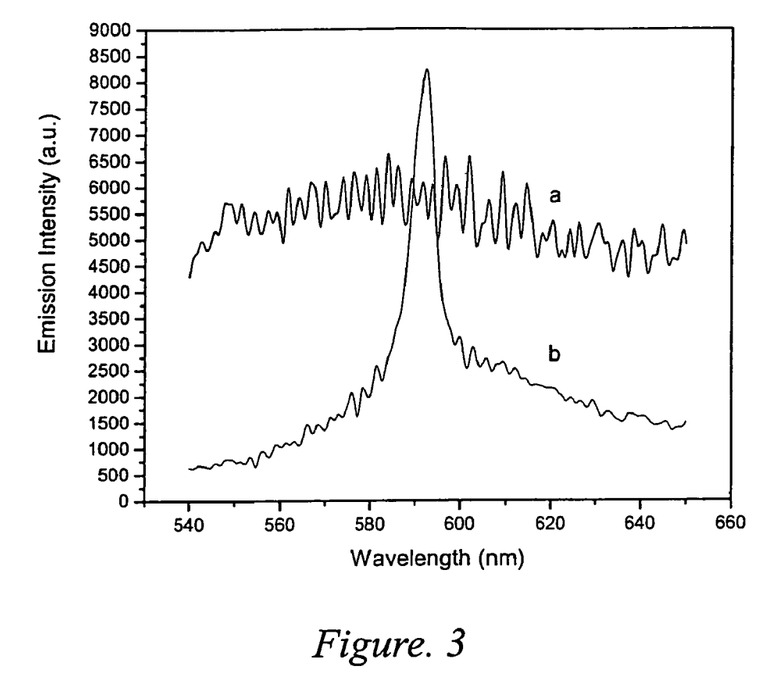
FIG. 3 illustrates the emission spectra of an exemplary laser emitting film doped with Rhodamine 590 and $TiO_2$ particles with a pumping energy density (a) 1.9 mJ/cm², (b) 95 mJ/cm² scaled up by a factor of 10.
Figure 4:
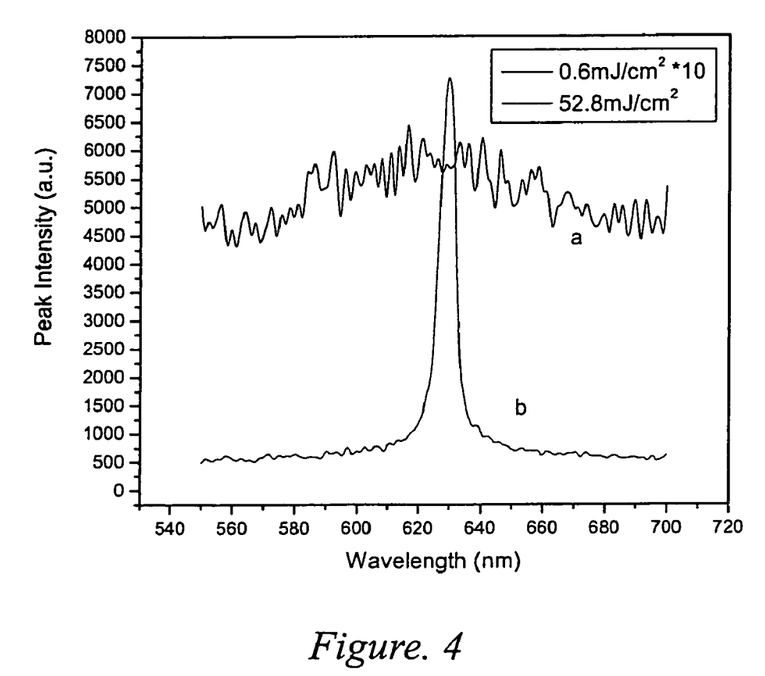
FIG. 4 illustrates the emission spectra of another exemplary laser emitting laser emitting film doped with Rh610 and $TiO_2$ particles pumped at (a) 0.6 mJ/cm² (b) 52.8 mJ/cm² scaled up by a factor of 10.
Figure 5:
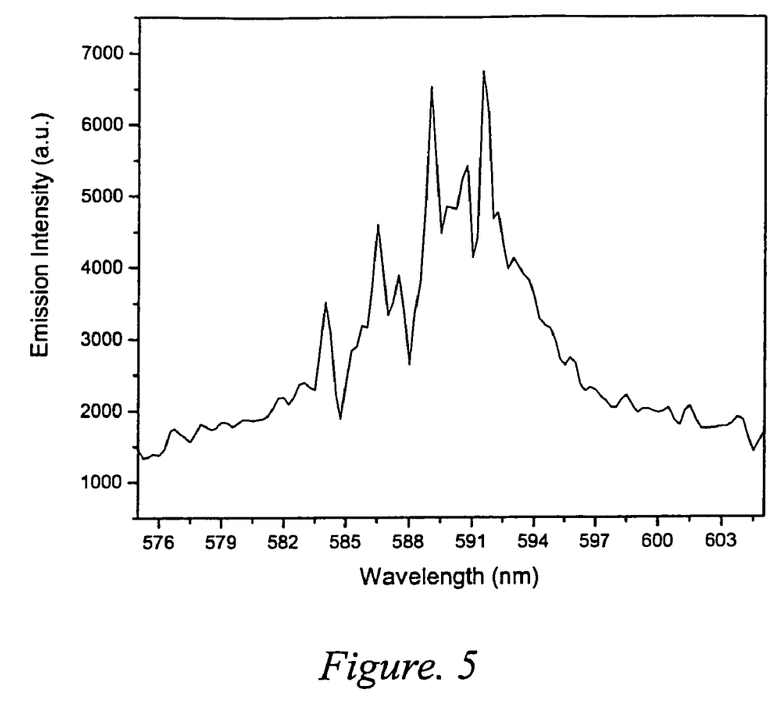
FIG. 5 illustrates the multimode laser line output above the threshold in the film containing rhodamine 590 and $TiO_2$ particles.

FIG. 1 is peak emission intensity of a PMMA film containing Rhodamine 590 and $TiO_2$ particles plotted against pump energy density. The inset is Its log-log curve. The lasing threshold is 5 mJ/cm². This shows a laser-like characteristic. FIG. 2 shows peak line-width of a PMMA film containing Rhodamine 590 and $TiO_2$ particles plotted against pump energy density. Line-width narrowing phenomenon is observed. The laser line-width is 8 nm. In FIG. 3, Emission spectra of PMMA film doped with Rhodamine 590 and $TiO_2$ particles with a pumping energy density (a) 1.9 mJ/cm², (b) 95 mJ/cm². A is scaled up by a factor of 10. In FIG. 4, the emission spectra of PMMA film doped with Rh610 and $TiO_2$ particles pumped at (a) 0.6 mJ/cm² (b) 52.8 mJ/cm². The amplitude of the spectrum in a has been scaled up by a factor of 10. FIG. 5 shows the multimode laser line output above the threshold in PMMA film containing rhodamine 590 and $TiO_2$ nano-particles. The light source for pumping the PMMA film is a pump laser of a double-frequency Nd:YAG laser which produced pulses of 8 ns at a repetition rate of 10 Hz.

Figure 6:
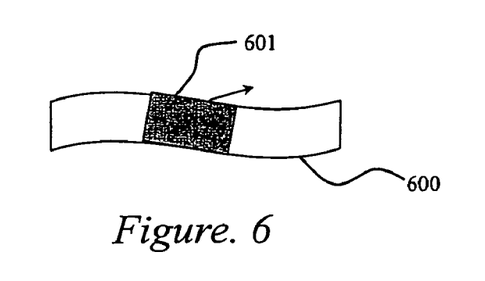
FIG. 6 illustrates an exemplary plaster with a random laser film according to another aspect of the invention.

FIG. 6 is an embodiment of a therapy device using the laser emitting films. FIG. 6 shows a plaster 600 with a random laser film 601. When the plaster 600 is placed onto the skin with flecks or stains (not shown) and is pumped by a flash lamp (not shown), the flecks can be eliminated.

Furthermore, a high-reflectivity mould (not shown) made of Aluminum Foil, acting as a reflector to reflect photons back to the film and to decrease the light loss, can be attached to a side of the laser emitting film to improve its laser-emitting capacities.

Nano-Composites Particles

Laser emitting particles (not shown) can also be obtained by spray drying to produce particles with random laser effect by atomizing a solution or slurry and evaporating moisture from the resulting droplets by suspending them in a hot gas. The production of dry, spherical particles from a liquid feed in a single processing step makes spray drying a unique and important unit operation. A nozzle laboratory current spray drier (not shown) equipped with a peristaltic pump (not shown) for feed fine control and cyclone collector of powder is used in this exemplary embodiment. Sampling along drying is performed under the following drying conditions: 170° C./96° C. (Inlet/outlet temperatures), volumetric airflow was 75 m³/h in all cases, while feed rate is 1.2 L/h and can change for each experiment.

Nano-Composites Fiber

In the production of an exemplary laser emitting fiber according to the present invention, Monomer MMA, $TiO_2$ particle and dye and other additive are mixed absolutely. Then ultrasonic is used to make the $TiO_2$ particle dispersed in the solution. Afterwards, the solution is polymerized under 50° C. for 4 hours, and then cured at 80° C. for 8 h. Further, the cured solution is spun into fibers 701, 703, 713 and 719 by using melt spinning method.

Figure 7A:
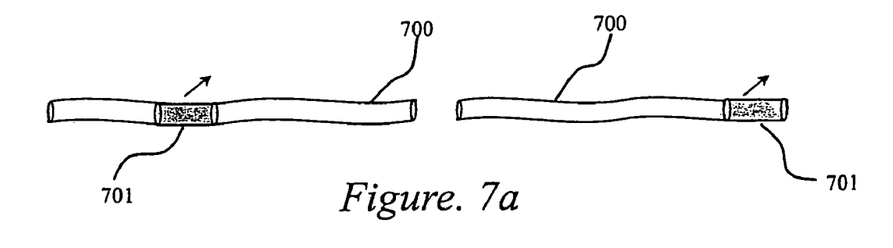
FIG. 7a illustrates an exemplary fiber with random laser materials.
Figure 7B:
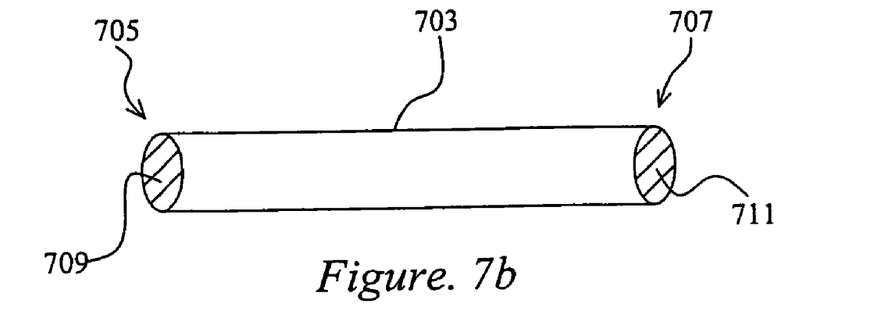
FIG. 7b illustrates an exemplary laser emitting fiber having its ends coated with a reflective film.
Figure 7C:
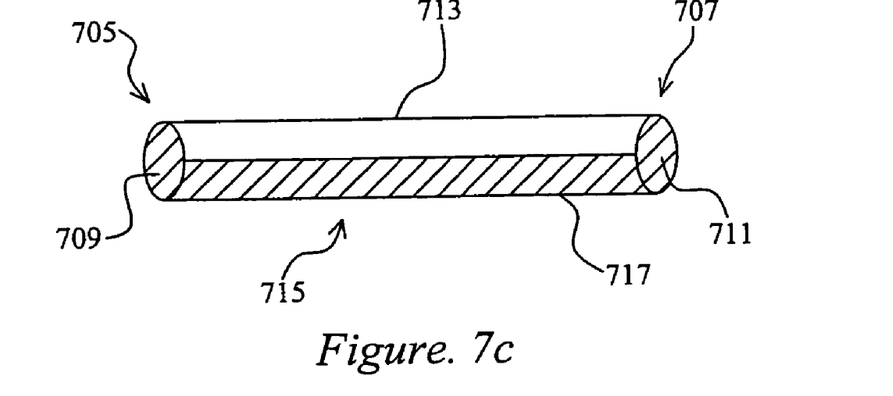
FIG. 7c illustrates an exemplary laser emitting fiber having a side coated with a reflective film.
Figure 7D:
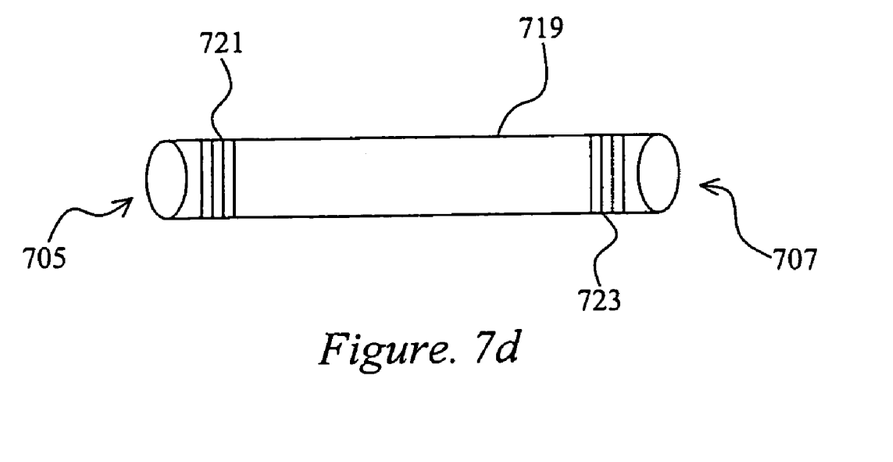
FIG. 7d illustrates an exemplary laser emitting fiber having gratings at its ends.

FIG. 7a illustrate such laser emitting fibers 700 w with nano composite fiber 701 in different locations. FIG. 7b illustrates another nano-composites fiber 703 with its two ends 705, 707 each coated with a reflective film of Aluminum 709,711. FIG. 7c illustrates a third nano-composites fiber 713 embodiment with its two ends 705, 707 and half a side surface 715 each coated with a reflective film of Aluminum 709, 711, 717. FIG. 7d illustrates yet another nano-composites fiber 719 embodiment having gratings 721, 723 created at its two ends 705, 077 for adjusting wavelength of the laser.

INDUSTRIAL APPLICABILITY

Figure 8:
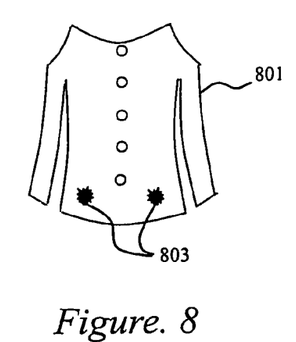
FIG. 8 illustrates an exemplary clothes pasted with exemplary laser films.
Figure 9:
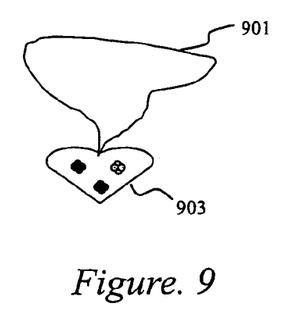
FIG. 9 illustrates a necklace with exemplary laser emitting clusters.
Figure 10:
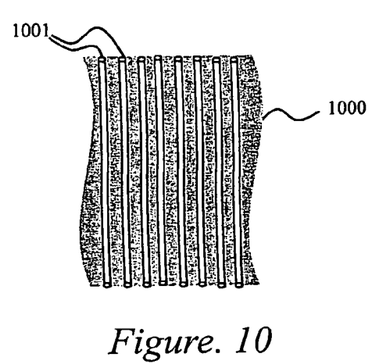
FIG. 10 illustrates textiles with exemplary laser emitting fibers.
Figure 11:
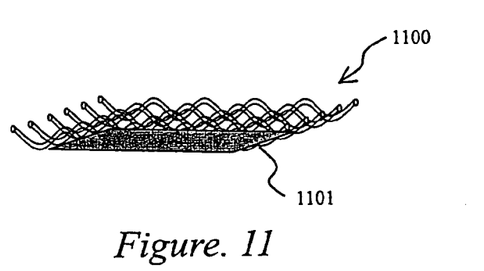
FIG. 11 illustrates fabrics coated with exemplary random laser films.
Figure 12:
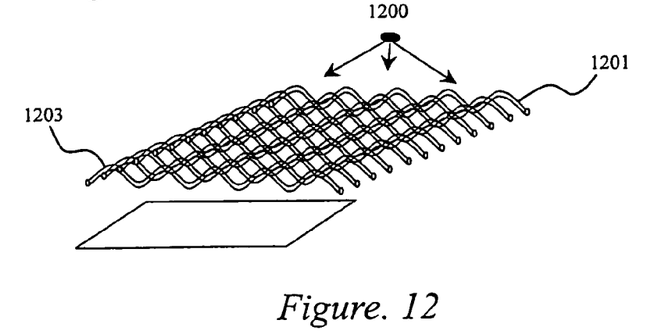
FIG. 12 illustrates the textile of FIG. 10 used as a therapy device.

The present invention may use the highly monochromatic sources (narrow spectral line-width) described thereabove to provide skin photothermolysis therapy. Various embodiments of such therapy devices can overcome the shortcomings of conventional large apparatus and expensive payment by using a film or textiles and a fiber to provide the skin therapy. For example, FIG. 8 illustrates clothes 801 pasted with laser films 803, which clothes can be used as therapy devices when worm by a patient. FIG. 9 illustrates a necklace 901 with colorful laser clusters 903. FIG. 10 illustrates textiles 1000 with laser fibers 1001, and FIG. 11 illustrates the fabrics 1100 coated with random laser material 1101. In FIG. 12 laser or flash lamp 1200 pumps fabrics 1201 made from random laser fibers 1203 so as to emit lasers for therapy purpose.

What is claimed is:

1. An item of clothing for use in providing a laser-therapy to a wearer of the item of clothing, the item of clothing comprising:
    a solid-state laser emitting material configured as at least one of a fiber and a film, the solid state laser emitting material including polymer matrix functioning as host materials, containing laser dye of rhodamine 590 or rhodamine 610 as gain materials and nano-submicron particles as scattering particles therein, the scattering particles being selected from the group consisting of $Al_2O_3$ nano-submicrons particles, ZnO nano-submicrons particles, their mixtures, and their mixtures with $TiO_2$ nano-submicrons particles thereof,
    the lowest lasing threshold of the laser emitting material being approximately 5 $mJ/cm^2$ for 585 nm emission and 2 $mJ/cm^2$ for 630 nm emission; and
    a light source configured for use in conjunction with the solid-state laser emitting material for stimulating laser emission from the solid-state laser emitting material;
    wherein the solid-state laser emitting material is configured for attachment to a flexible fabric of the item of clothing such that when the item of clothing is ordinarily worn by the wearer, laser emissions from the solid state laser emitting material are able to be flexibly directed into contact with the wearer's skin to effect laser therapy.

2. The item of clothing of claim 1, further comprising a reflector attached to the polymer matrix.

3. The item of clothing of claim 2, wherein the reflector is designed to be a metal reflective film.

4. The item of clothing of claim 3, wherein the reflective film is made of aluminum.

5. The item of clothing of claim 1, wherein the host materials are selected from a group of polycarbonate (PC), polymethyl methacrylate (PMMA), polystyrene (PS) or mixtures thereof.

6. The item of clothing of claim 1, wherein the light source is designed to be a pump laser of a double-frequency Nd:YAG laser which produced pulses of 8 ns at a repetition rate of 10 Hz.

7. The item of clothing of claim 1, wherein the fiber extends in an at least a substantially longitudinal direction and terminates at two opposite ends, further comprising at least a reflector positioned at one of said ends.

8. The item of clothing of claim 1, wherein the reflector is designed to be a metal reflective film.

9. The item of clothing of claim 1, wherein the fiber extends in an at least substantially longitudinal direction and terminates at two opposite ends, further comprising at least a reflector positioned along at least a portion of a side surface of the fiber along the longitudinal direction.

10. The item of clothing of claim 9, wherein the reflector is designed to be a metal reflective film.

11. The item of clothing of claim 1, wherein the fiber extends in an at least substantially longitudinal direction and terminates at two opposite ends, further comprising at least a grating created at one of said ends.

12. The item of clothing as claimed in claim 1 wherein the solid-state laser emitting material is configured as a plurality of fibers which are woven, embroidered, braided or intermingled to form a textile, and wherein
    the textile further comprising two opposite sides, with one side coated with a reflective film.

13. The item of clothing as claimed in claim 12, wherein the reflective film is made of aluminum.

14. The item of clothing as claimed in claim 1 configured as a plaster.

15. A method of forming an item of clothing for use in providing a laser-therapy to a wearer of the item of clothing comprising a solid-state laser emitting material configured as at least one of a fiber and a film, the solid state laser emitting material including polymer matrix functioning as host materials, containing laser dye of rhodamine 590 or rhodamine 610 as gain materials and nano-submicron particles as scattering particles therein, the scattering particles being selected from the group consisting of Al2O3 nano-submicrons particles, ZnO nano-submicrons particles, their mixtures, and their mixtures with TiO2 nano-submicrons particles thereof, the lowest lasing threshold of the laser emitting material being approximately 5 mJ/cm2 for 585 nm emission and 2 mJ/cm2 for 630 nm emission; and a light source configured for use in conjunction with the solid-state laser emitting material for stimulating laser emission from the solid-state laser emitting material; wherein the solid-state laser emitting material is configured for attachment to a flexible fabric of the item of clothing such that when the item of clothing is ordinarily worn by the wearer, laser emissions from the solid state laser emitting material are able to be flexibly directed into contact with the wearer's skin to effect laser therapy, the method including the steps of: mixing a laser dye of rhodamine 590 or rhodamine 610 and nano-submicrons scattering particles in a dichloromethane resolution until the laser dye is dissolved; adding a dichloromethane resolution of a polymer matrix to the mixture of the laser dye and nano-submicrons scattering particles; after addition of the dichloromethane resolution of the polymer matrix, sonificating the mixture until an at least substantially homogeneous solution is formed; and cell-casting the solution for forming the film.

16. The method of claim 15, wherein the weight ratio of the laser dye to polymer matrix is in a range of approximately 0.46 wt %-0.57 wt %.

17. The method of claim 15, wherein the weight ratio of $TiO_2$ particles to the polymer matrix is approximately 0.57 wt %.

* * * * *